US005529293A

United States Patent [19]

Haugs

[11] Patent Number: 5,529,293

[45] Date of Patent: Jun. 25, 1996

[54] ARRANGEMENT OF PULLING MEANS

[76] Inventor: Audun Haugs, Natlandsfjellet 56, N-5030 Landås, Norway

[21] Appl. No.: 50,156

[22] PCT Filed: Nov. 5, 1991

[86] PCT No.: PCT/NO91/00137

§ 371 Date: Apr. 27, 1993

§ 102(e) Date: Apr. 27, 1993

[87] PCT Pub. No.: WO92/07789

PCT Pub. Date: May 14, 1992

[30] Foreign Application Priority Data

Nov. 5, 1990 [NO] Norway .................................... 904788

[51] Int. Cl.[6] .................................... F16F 5/00; F16J 3/00

[52] U.S. Cl. ................................ 267/118; 267/69; 92/92; 254/93 HP

[58] Field of Search ................................ 267/69, 70, 73, 267/64.27, 64.28, 113, 118, 119, 122, 123, 162; 254/254, 93 HP, 228, 277; 114/214, 230; 92/92

[56] References Cited

U.S. PATENT DOCUMENTS

| | | | |
|---|---|---|---|
| 2,610,824 | 9/1952 | Grier | 254/93 HP |
| 2,804,118 | 8/1957 | Bayerkohler | 254/93 HP |
| 3,233,886 | 2/1966 | Saffell et al. | 267/122 |
| 3,321,200 | 5/1967 | Polhemus et al. | 267/64.27 |
| 3,645,173 | 2/1972 | Yarlott | 92/92 |
| 3,967,809 | 7/1976 | Skantar | 92/92 |
| 4,295,635 | 10/1981 | Pustka et al. | 254/93 HP |
| 4,629,170 | 12/1986 | Warmuth II | 267/64.27 |
| 5,320,331 | 6/1994 | Hellman, Sr. | 267/122 |

FOREIGN PATENT DOCUMENTS

| | | | |
|---|---|---|---|
| 1589060 | 4/1970 | France . | |
| 2106516 | 2/1972 | Germany . | |
| 3032638 | 3/1981 | Germany . | |
| 3743551 | 7/1989 | Germany . | |
| 0838170 | 6/1981 | U.S.S.R. | 267/123 |
| 2116667 | 9/1983 | United Kingdom . | |
| 0166702 | 1/1986 | United Kingdom | 267/64.27 |
| 2206158 | 12/1988 | United Kingdom . | |

*Primary Examiner*—Robert J. Oberleitner
*Assistant Examiner*—Chris Schwartz
*Attorney, Agent, or Firm*—McAulay Fisher Nissen Goldberg & Kiel

[57] ABSTRACT

The lifting apparatus employs a plurality of stacked annular discs, each of which is secured at the inner and outer periphery to an adjacent disc to define a hollow space. Circular discs are secured at the opposite ends of the stacked annular discs to enclose the hollow space. The lifting apparatus is collapsible from an extended elongated position to a collapsed position. A nipple is provided to permit the entry of compressed air into the hollow space when the lifting apparatus is in the elongated extended position to allow the hollow space to be radially expanded while being longitudinally contracted in order to effect lifting of an object secured to the lower end of the listing apparatus.

14 Claims, 5 Drawing Sheets

FIG.1
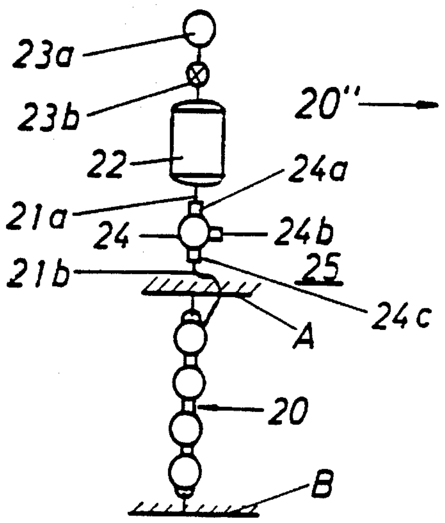
FIG.7
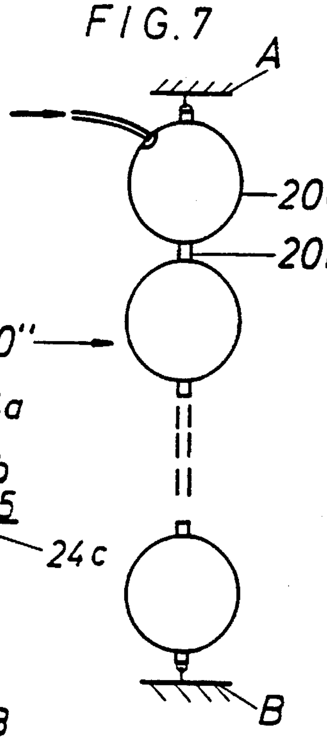
FIG.8
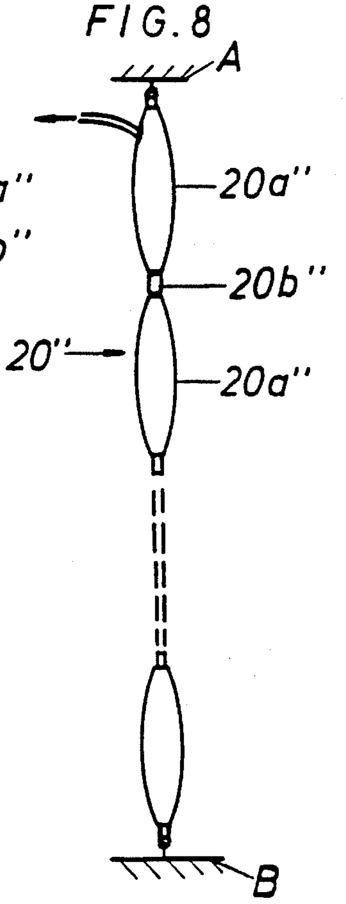
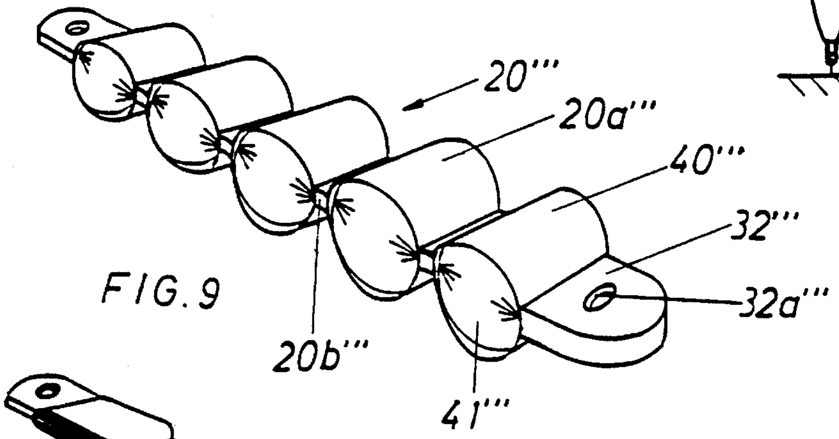
FIG.9
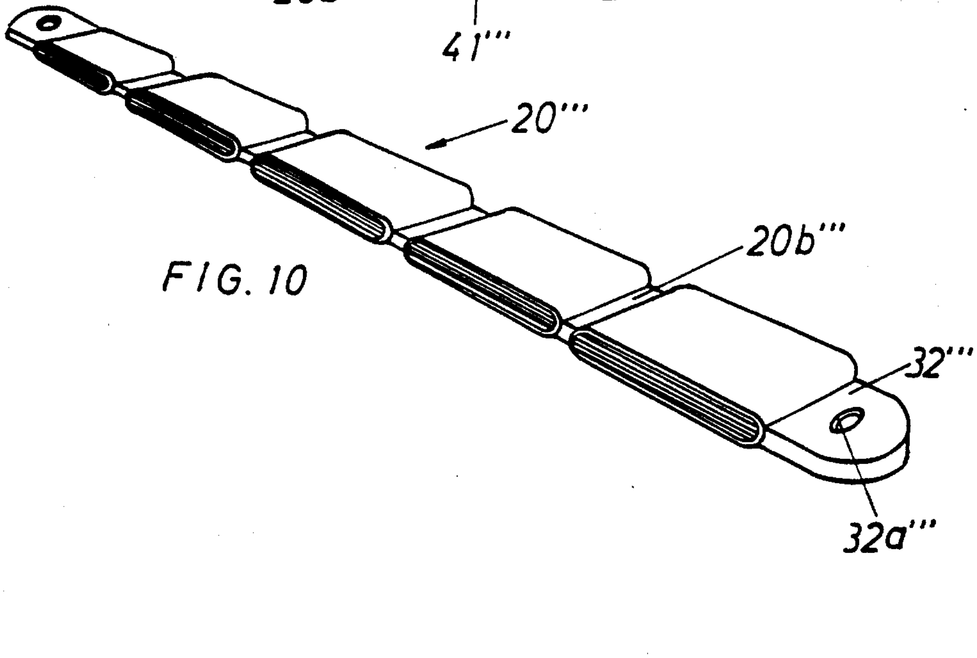
FIG.10

FIG. 16
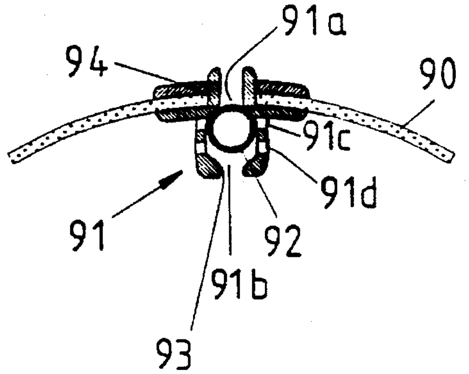
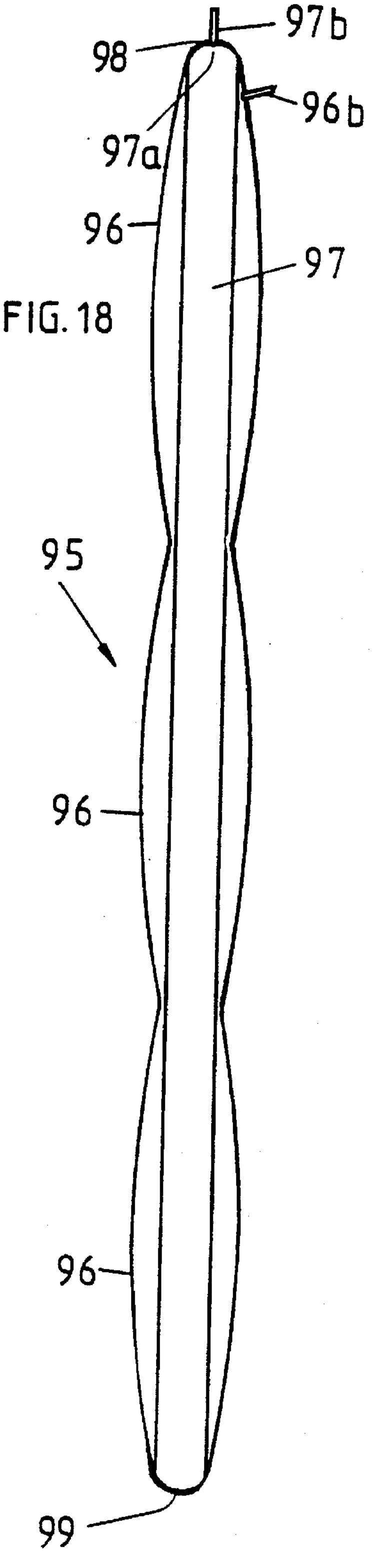
FIG. 18
FIG. 17
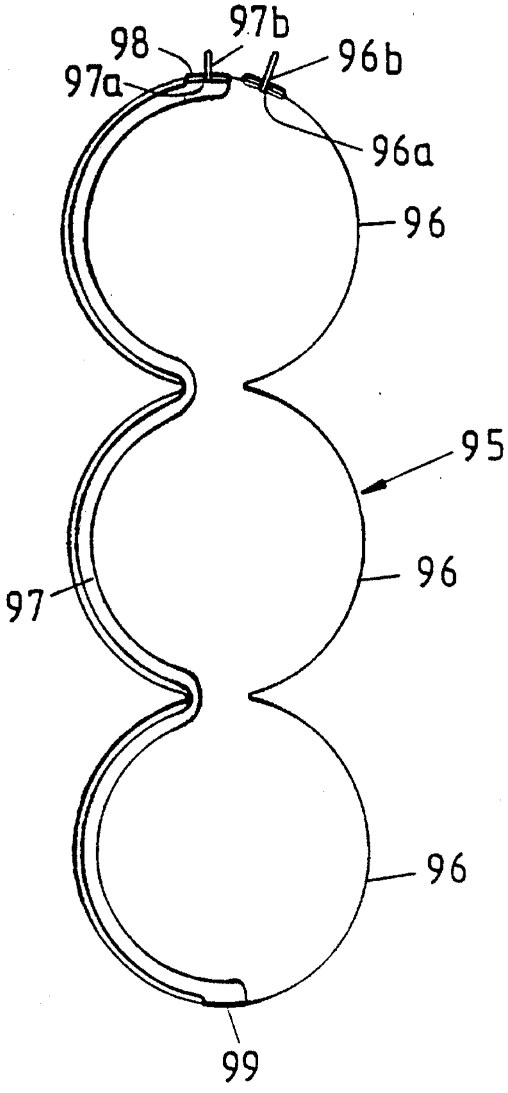

ARRANGEMENT OF PULLING MEANS

The present arrangement relates to an arrangement of elongate, hollow pulling means, which is provided at opposite ends with fastening means for fixing of the pulling means between two opposite fastening points and at the one end is provided with a pressure medium-supply conduit, which is connectable to a source of pressure medium via a pressure regulating arrangement, and the pulling means being adapted, on actuation of the pressure regulating arrangement, to exert a regulatable pulling force between the fastening points.

-DE-A-2 21 06 516 describes a pulling means which uses a flexible lifting means, i.e. an elongate hollow pulling means provided by a single flexible tube. The pulling effect is caused by inflating the tube by means of compressed air. The suggested tube is provided with a specific reinforcement, in order to operate in controlled manner as intended. This means that a high amount of the power of the compressed air which is supplied to the pulling means is being used to radially expand the reinforced flexible tube. Accordingly, the available lifting power is correspondingly reduced in practice due to the use of reinforcement means.

Accordingly it is an object of the invention to provide a relatively simple pulling menas which can be retracted in the longitudinal direction with a minimum of work.

It is another object of the invention to provide pulling arrangement employing a series of inflatable covers which do not require support means when inflated.

Briefly the invention provides a pulling arrangement which is made of a series of mutually defined cross-sectionally wide hollow space-forming covers which are mutually communicating through intermediate transition portions. The pulling means is made of flexible, relatively non-elastic wall material and the covers are manufactured with relatively small wall thickness and relatively large volume, whereas the transition portions are manufactured with an increased wall thickness and circumferentially constricted shape. The pulling means between each pair of covers defines a rather rigid transition portion and a relatively shape-stable support for the associated covers.

According to the invention one has consequently been able to limit the wall material of the pulling means to a cover, which encloses the hollow space sections, and constricted transition portions, which connect the covers to each other. In other words, the pulling means is made of a series of mutually defined and mutually communicating covers, which are defined in pairs by means of the intermediate, constricted transition portions. By this one has the possibility to effect sideways expansion of and longitudinal contraction of the pulling means exclusively via the covers and independently of the transition portions. In other words, one has the possibility to exert a contraction of the pulling means in a controlled manner exclusively in the regions where the covers are located, while the relatively shape-stable transition portions exclusively form connection between the covers and transfer the pulling forces between them.

In contrast to a structure as described in DE-A-2106516, the series of hollow covers is able to retract in their longitudinal direction without the need of support means when they are inflated in order to limit the amount of power used for compressed air or other inflating medium which is used to radially expand the pulling arrangement.

The pulling means according to the invention has application in a series of different areas both in connection with hauling and putting out of an object and in connection with lifting and lowering of an object. The present invention also relates to a use of the pulling means as a resilient pulling means, wherein the resilience characteristic of the pulling means is regulated by regulating the pressure of the pressure medium which is supplied to the pulling means.

The characterising features of the pulling means as a resilient pulling means are that the pulling means is inserted between two parts in a wire, chain or the like, in a tension-receiving short circuit path between the two parts, and that the pulling means communicates directly via a first conduit connection with an associated pressure tank, which is supplied with pressure medium from a medium reservoir via a pressure medium pump and communicates directly with the medium reservoir via a second conduit connection having an associated, pressure-regularable back pressure valve for adjusting the pulling means to a set pressure medium pressure. A particular application of the pulling means is as a power means which can replace the functions of conventional winches. A completely special application is as so-called "mooring" means, which can ensure constant tension in a connected wire or chain, largely independent of the tractive force which prevails in the wire or chain. It will be possible to use the pulling means as a separate power means, but it will also be possible to use two or more pulling means in different combinations in order to ensure opposite movements of a jointly engaged body or in order to ensure an increased lifting effect.

The afore-mentioned solution has significance for pulling means which are to transmit relatively moderate tractive forces, for example up to a couple of hundred kilo, and has greater significance the greater the tractive forces to be transmitted. On transmitting large tractive forces, for example of the order of magnitude of 100 tons or higher, it is of decisive importance that the forces which occur in the pulling means can be transmitted in a controlled manner through the pulling means.

Further features of the present invention will be evident from the following description of some relevant embodiments having regard to the accompanying drawings, in which:

FIG. 1 shows schematically a system for regulating the tractive force of a pulling means according to the invention by means of compressed air.

FIG. 7 and 8 show in side view, in two different positions, a pulling means according to a second embodiment according to the invention.

FIG. 9 and 10 show in side view, in two different positions, a pulling means according to a third embodiment according to the invention.

FIG. 16 shows in cross-section an extra air valve, for use in the pulling means under application of fluid as pressure medium.

FIG. 17 and 18 show in cross-section a pulling means with an outer force means and an inner auxiliary means, shown in the active position of the pulling means and in the inactive position of the pulling means, respectively.

Figure 2:
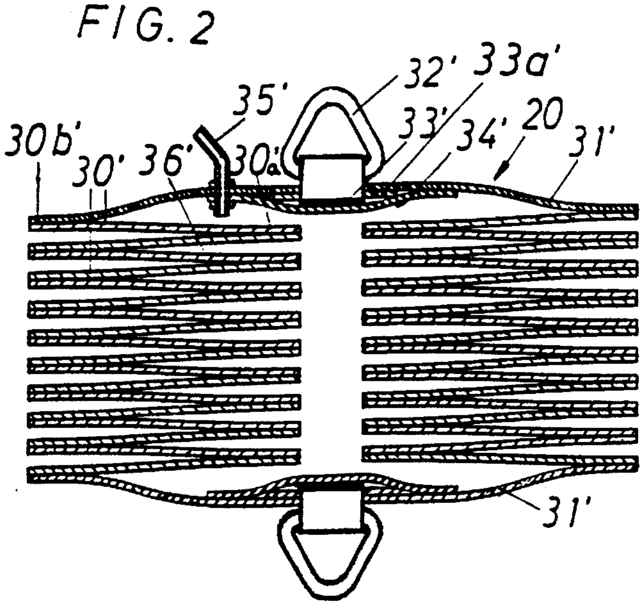
FIG. 2–4 show in cross-section,in three different positions, a pulling means according to a first embodiment according to the invention.

In FIG. 1 there is shown a hollow, inflatable pulling means 20, which is connected at the one end via a conduit 21*a*, 21*b* to a compressed air tank 22. The compressed air tank 22 is supplied with compressed air from a compressor 23*a* via a pressure valve 23*b*. In the conduit 21*a*, 21*b* there is inserted between the pulling means 20 and the compressed air tank 22 a three-way pressure-regulating valve 24. A pressure-regulating valve 24 is illustrated having a first duct 24*a*, which communicates via the conduit 21*a* with the compressed air tank 22, and a second duct 24*b*, which communicates via the conduit 21*b* with the pulling means 20, together with a third duct 24*c* which communicates directly with outside air, as shown at 25. In a first position the regulating valve 24 can provide for the supply of compressed air from the compressed air tank 22 to the pulling means 20, during simultaneous regulation of the pressure of the compressed air in the pulling means. In a second position, the regulating valve can discharge compressed air from the pulling means 20 to outside air 25, during simultaneous regulation of the pressure of the compressed air in the pulling means 20.

In FIG. 1 there is shown an embodiment where compressed air is employed as a driving medium. In this connection there is only illustrated a conduit connection to one, upper end of the pulling means 20. In a case where pressure fluid, for example water under pressure, is employed as the driving medium, the illustrated conduit at the one upper end of the pulling means can be employed as a supply conduit for pressure fluid, while there can be arranged at the opposite end (or possibly at the same end) a conduit connection with associated valve, for drawing off fluid from the pulling means to a suitable discharge location. Correspondingly by employing pressure oil of low pressure or high pressure as the driving medium (inflating medium) one can have a supply conduit connected to a first end of the pulling means and a return conduit connected to a second end of the pulling means or alternatively there can be employed one and the same conduit for directing the driving medium to and from the pulling means In FIG. 1 the pulling means 20 is shown fixed between an upper fastening A via a first loop 26 at the upper end of the traction means 20 and a lower fastening B via a second loop 27 at the lower end of the traction means.

The aim is the use of various types of pulling means for different purposes of use, where different large pulling forces are required. For example there can be employed a first type (light weight) pulling means for pulling forces in the region of 0–200 kg, a second type (middle weight) pulling means for pulling forces in the region of 0–2000 kg and a third type (heavy weight) pulling means for pulling forces in the region of 0–100 ton or more. The different types of pulling means can be made of different materials and have different constructional structures. Subsequently there will be described various types of preferred pulling means having regard to various Figures of the drawings.

In FIG. 2–6 a pulling means 20' is shown of a first type, which can find application for example as a lifting means in a workshop or factory for lifting of an object from a base to a suitable level above the base. As a particular application of interest, lifting means can be mentioned for use in a passenger lift for a bed couch for use in hospitals, in institutions or in the home. In order to obtain a lifting means as far as possible "soft" and elastically springy, which can allow a "soft" movement of the raised person, in a vertical direction as well as in the lateral direction after the person is raised upwardly from the base, pneumatic operation is preferred. As another application of current interest there can be mentioned a lifting means in passenger lifts for use in hospitals, in institutions or in the home for conveying a person from a bed couch to a couch in a bath tub, and back. In order to achieve a best possible control of the transport movements, a non-elastic lifting movement is preferred, something which can be effected with advantage by use of pressure fluid as driving medium.

The pulling means 20' is constructed of annular discs 30' of soft, non-elastic, stretch-firm canvas material. The canvas material can for example consist of PVC-coated, polyethylene fibre-reinforced canvas material. The annular discs 30' are shown in FIG. 2 arranged in layers over each other and are connected to each other in pairs with a first, inner annular welded joint 30*a*'at the inner periphery of the annular discs and with a second, outer annular weld joint 30*b*' at the outer periphery of the annular discs. Where it must be preferred (not shown further herein) one can employ in addition to the weld joint itself one or more seam lines in or at the weld joint. In addition, one can also employ extra bracing means enclosed in the weld joint or overlapping the weld joint on opposite sides of the latter and possibly also overlapping inner edges of the annular discs. By means of the annular discs, there is formed an "accordion" like, bellows-shaped, hollow pulling means 20'. There is illustrated an annular disc 30' having an inner diameter Di of for example 10 mm and an outer diameter Dy of for example 200 mm. Internally in the pulling means 20' there is formed a series of covers 36' forming mutually communicating, pairs of abutting hollow spaces (see FIG. 3 and 4), which are each defined between their respective pairs of mutually abutting annular discs 30'. At two opposite ends of the pulling means, the covers are formed by an inner annular disc 30' and an outer circular disc ("rondel") 31' which seals off the series of covers 36'.

At opposite ends, the pulling means 20' is provided via the associated circular disc 31' with a fastening loop 32'. Fastening plate 33' of the fastening loop 32' is fixed in between the circular disc 31' and a reinforcing plate 33*a'* of canvas material arranged internally in the pulling means 20'. Innermost in the cover, the fastening plate 34' and the reinforcing plate 33*a'* are covered by a cover disc 34'. A nipple 35' is led through the circular disc 31' and the plate 34' for connecting the pressure medium conduit 21*b* (see FIG. 1) to the inner hollow space of the pulling means 20'.

Internally in the pulling means there are formed a number of covers 36' forming in a row successive hollow spaces in a longitudinally extended condition (FIG. 3) each of the covers 36' is pulled out to a length $Lu=\pi r$ (half the arc of a circle). In an inflated condition (FIG. 4) each cover assumes an approximately spherical shape with an axial length $Ls=2r$. In other words by by inflating or by other dilating of the single cover 36' the latter can be contracted an axial length $\Delta L=Lu-Ls$, that is to say an axial length $\Delta L=\pi r-2r=1.14$ r. The force which is exerted during the pulling movement can be regulated by means of the pressure of the compressed air which is supplied to the pulling means 20'. The larger the covers 36' one employs the greater the pulling force one can exert in the pulling means with one end and the same supplied pressure.

The pulling means 20' is made so that it can be readily transposed from a folded together condition i.e. collapsed position (FIG. 2), having minimal length and having little need for space, to a longitudinal optimally extended condition (FIG. 3), ready for use. Thereafter compressed air is supplied to the pulling means during inflating of the latter to a reduced length, a contraction of the pulling means thereby being obtained dependent on the pressure of the pressure medium and the weight which is to be lifted or the traction which is to be exerted in the pulling means. The pulling action is based on a positive contraction of the pulling means being obtained longitudinally, at the same time as a regulatable traction force is exerted in the pulling means by feeding pressure-regulating pressure medium to the pulling means itself. With a relatively moderate pressure of medium of the supplied pressure medium a relatively large traction in the pulling means can be obtained. An arbitrary number of covers 36, can be employed as required. In the illustrated embodiment 10 covers 36' are shown in a row.

In FIG. 2 the pulling means 20' is shown in storage condition in a manner requiring little space, with the annular discs folded together over each other and with the air discharged approximately to the maximum out of the pulling means.

Figure 3:
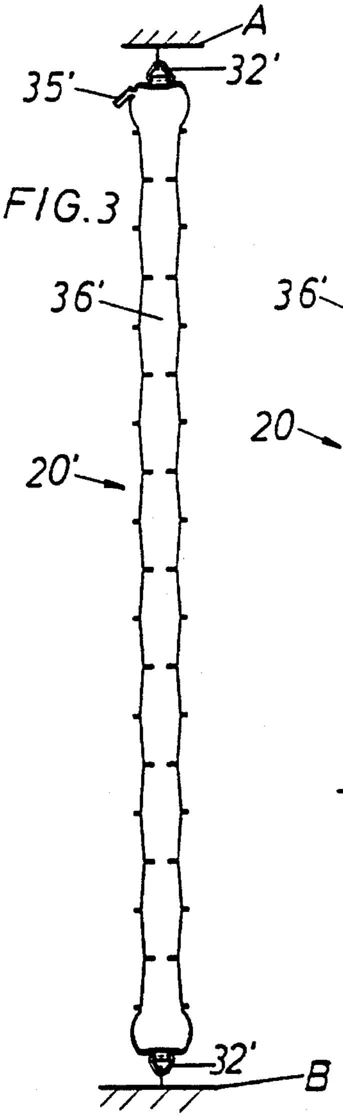

In FIG. 3 the pulling means 20' is shown in almost the maximum extended condition during exertion of a moderate (manual) traction in the pulling means between the fastening loops 32', before a pulling operation (lifting) is effected. The pulling means is as shown in FIG. 2 and 3 fixed between two fastening points A and B, for example, an upper means defining a stationary fastening point A and a means defining a lower movable fastening point B.

Figure 4:
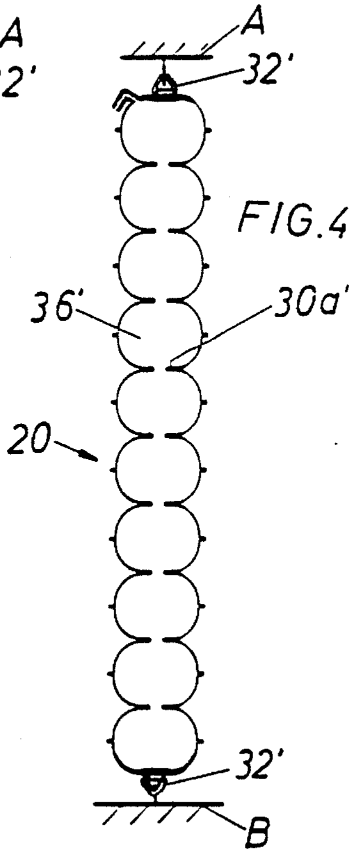

In FIG. 4 the pulling means 20' is shown in a compressed air-loaded (but not necessarily weight-loaded) condition, where the fastening points A and B are compressed (contracted) towards each other by means of the pulling means 20' and the tractive force which is exerted in the latter by means of supplied compressed air.

Figure 5:
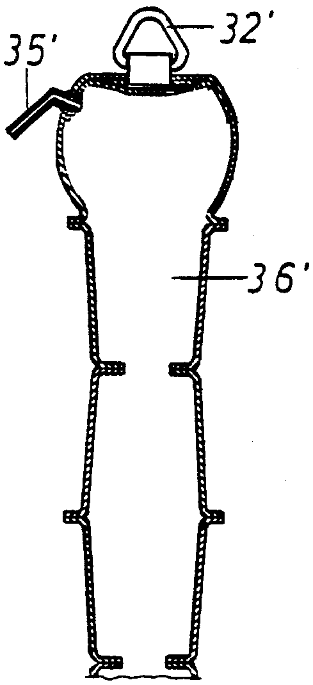
FIG. 5 and 6 show on a larger scale a section of the upper end of FIG. 3 and 4.
Figure 6:
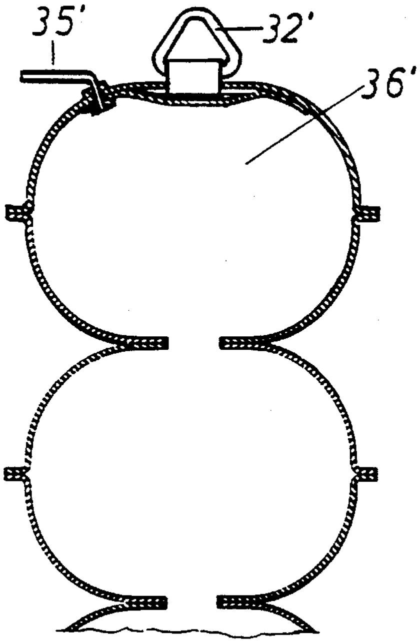

In FIG. 5 and 6 there are shown de'tails at one, upper end of the pulling means. In the drawing there is shown a nipple 35' only at one, upper end of the pulling means, but alternatively a corresponding nipple (discharge nipple) can also be employed at the other, lower end of the pulling means.

In FIG. 7 and 8 there is shown a pulling means 20" according to a second type and according to a second construction, where each cover 36" is defined in the pulling means in its respective spherical section **20*a*" of the latter. Between each pair of sections 20*a*" there is arranged a radially constricted transition portion 20*b*". In FIG. 7 the pulling means 20" is shown in a position (corresponding to the starting position), where each section 20*a*" is shown spherical, while the pulling means in FIG. 8 is shown in a (manually) extended condition, where the spherical sections 20" are deformed by means of a moderate manual traction in the pulling means to an elongate sausage shape between the transition portions 20*b*". The pulling means 20" is fastened in its extended condition, as shown in FIG. 8, between a stationary, upper fastening point A and a lower fastening point B on an object which is to be lifted. By subsequent pressure loading (inflating) of the streching means 20" sections 20*a*" of the pulling means are brought back into the original spherical condition, as shown in FIG. 7, at the same time as the axial length of the pulling means 20"** is reduced and the object fastened to this is raised a corresponding height.

In FIG. 9 and 10 there is shown a pulling means 20''' of the second or third type in the form of a third embodiment. Instead of spherical sections, as shown in FIG. 7 and 8, approximately cylindrical sections **20*a*''' are employed, that is to say sections which in a pressure-loaded condition (FIG. 9) have a cylindrial shape, but which in an unloaded condition (FIG. 10**) have an approximately planar outline.

Alternatively the pulling means can be designed with a cylindrical shape in an unloaded condition and with a planar outline in a stretch-loaded condition. The sections **20*a*''' are designed with the cylindrical surfaces mutually abutting via an intermediate transition portion 20*b*''' of rectangular cross-section. At the ends the pulling means is provided with holder means 32''' with associated fastening holes 32*a*'''. Cylinder wall 40''' of the cylindrical shape can be made of a relatively shape-stable, axially braced, but readily flexible in the peripheral direction, relatively thick-walled, reinforced plastics material or vulcanised rubber material. End walls 41''' of the cylindrical shape can be made of soft, readily flexible, but non-elastic canvas material, which along the periphery can be welded to or secured in another suitable way to the cylinder wall 40''' and to the transition portion 20*b*''' and to a holder means 32''' respectively. Alternatively the cylinder walls and the transition portions plus the holder means can be made in one piece with continuous reinforcing means. Correspondingly as the cylinder wall 40''' the transition portions 20*b*''' and the holder means 32'''** can be made of thick-walled, reinforced and relatively shape-stable material, for example polyethylene fibre-reinforced PVC plastic or reinforced, vulcanised rubber material.

Figure 11:
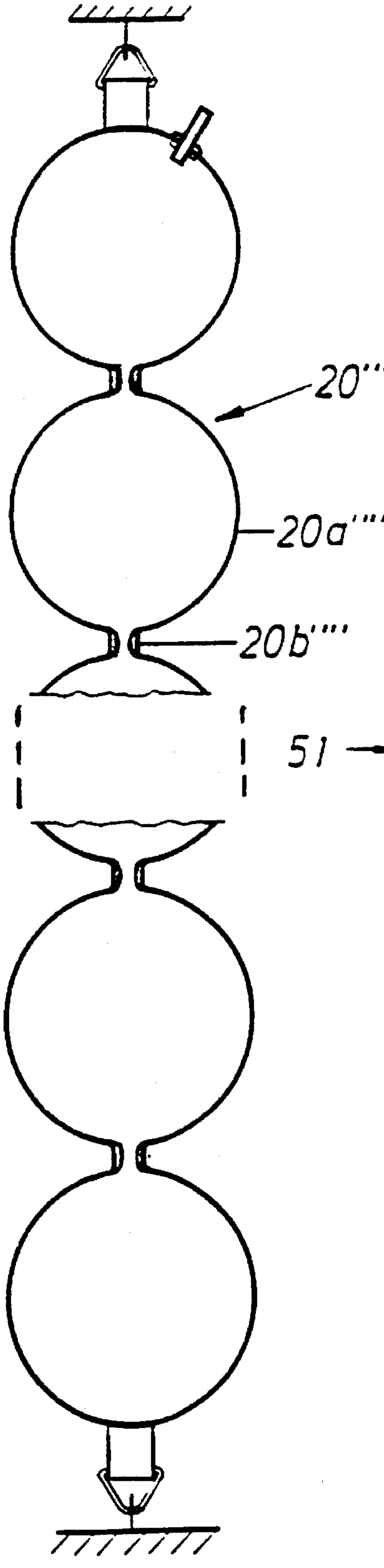
FIG. 11 shows in cross-section a pulling means according to a fourth embodiment according to the invention.

In FIG. 11 a pulling means 20"" is shown of the second type of a fourth construction. Instead of making the pulling means of separate sections there is shown a pulling means fabricated in one piece. This Dulling means 20"" can be specially made for use as a resilient pulling means, that is to say a pulling means which can be given different elastic characteristics by regulating the pressure in the pulling means. The pulling means can be made by twisting a mesh of reinforcing fibres on an inflated core which is coated with a thin layer of plastic and thereafter building up the wall thickness with layers of plastic and reinforcing layers arranged the one on the outside of the other.

Figure 12:
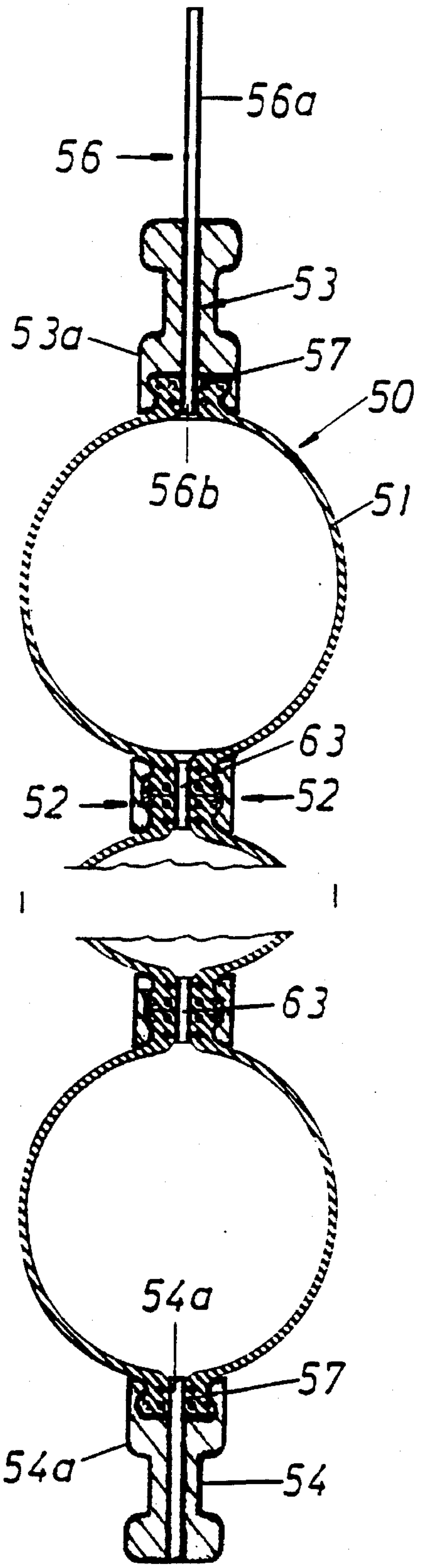
FIG. 12 shows in cross-section a pulling means according to a fifth embodiment according to the invention.

In FIG. 12 there is shown a third type of pulling means 50 according to a fifth construction. The pulling means 50 is composed of a series of hollow space sections 51 (see also FIG. 13) spherical at the start.

Each pair of hollow space sections 51 are as shown in FIG. 12 mutually connected to each other by means of a two part collar-forming connecting piece 62, while the two hollow space sections which are placed at opposite ends of the pulling means are provided with two part sleeve-shaped; holder means 53 and 54 respectively.

In the one, upper holder means 53 there is inserted in an inner bore 55 in permanent connection with the holder means an elongate, rigid pipe piece 56, which projects with the one end **56*a* substantially outside (above) the holder means 53. The other, short end 56*b* of the pipe piece 56 projects inwardly into (downwardly into) an equivalent bore 57 in the adjacent end of the section 51, where the pipe piece is equivalently permanently connected to the section 51**.

In the other, lower holder means 54 there is designed a pin **54*a* which projects inwardly into and occupies an adjacent bore 56 in the adjacent section 51**.

Figure 13:
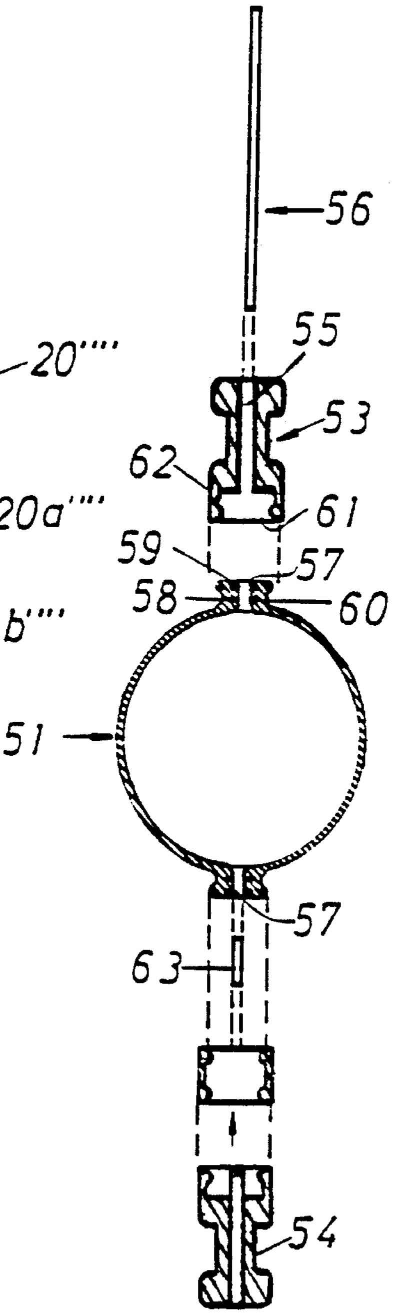
FIG. 13 shows in cross-section and in extended condition various components which form a part of the pulling means according to FIG. 12.

As is evident most clearly from FIG. 13 each section 51 is provided at opposite ends with a continuous bore 57 in an axially outwardly directed neck portion 58 which is terminated outermost by a radially outwardly directed collar portion 59. In the neck portion 58 and the collar portion 59 there are imbedded extra, annular reinforcing and bracing means 60. The holder means 53 and 54, which are each provided with a collar portion **53*a* and 54*a* respectively, and also the collar-forming connecting pieces 52 are provided with equivalent gripping flanges 61 directed radially inwards, which ( see FIG. 12 ) grip around neck portion 58** of the section 51, while the collar portion 59 is received in an equivalent, axially inner cavity 62. In each joint between each pair of sections 51 there is internally arranged a short pipe stump 63 in mutually adjacent sleeve portions of the sections 51.

The sections 51 are made in the illustrated embodiment of vulcanised rubber or similar stretch-firm material.

In the above described embodiments there is mainly discussion about axially rectilinearly moveable pulling means, that is to say pulling means which are moveable forwards and backwards in a more or less rectilinear movement between two fastening points. However it is apparent that the flexible pulling means as illustrated in the various embodiments above can also be moved sideways relative to the longitudinal axis.

Figure 14:
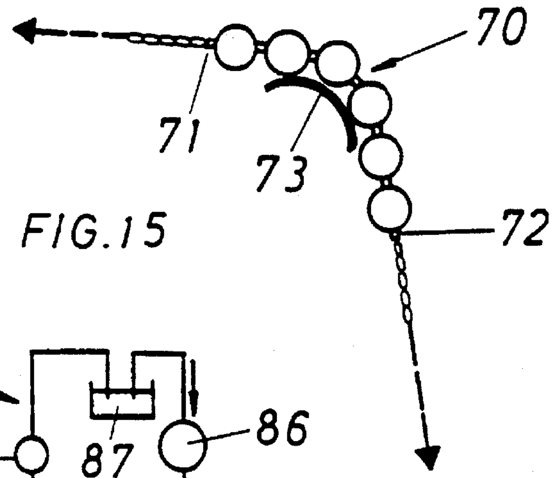
FIG. 14 shows in side view a particular application of a pulling means according to the invention, shown in an angular outline between its fastening points.

In a particular application, as shown in FIG. 14, there is shown a solution where a pulling means 70 has an angular outline between its opposite ends 71 and 72 in order to be able to exert a pulling operation past a corner-shaped obstacle. There is shown an abutment 73 arranged between the ends 71, 72, so that the pulling means is given a turned or arcuate contour at the middle portion and thereby an angled contour between the ends. By exertion of a stretch in the pulling means 70 between the ends 71, 72 one can equivalently exert a relatively small force of pressure against the abutment 73. Alternatively by exerting a significant sideways directed pressure against the pulling means from its starting position, where it can have a largely rectilinear outline, one can equivalently deform the pulling means with an arrow height force and thereby exert a considerably increased traction between the ends 71, 72. Such arrow height force can for example be exerted by means of a second pulling means according to the invention which extends transversely of the axial direction of a first pulling means according to the invention.

In connection with a bending of the pulling means, such as shown in FIG. 14, the bending itself takes place in hollow space-forming covers 74 of the pulling means in the region just by the relatively rigid, short transition portions 75 by local, intermittent deformation of the cover wall itself. By employing more elongate transition portions (not shown further) one can possibly transfer the bending into the transition portion itself.

According to the invention it is possible to combine pulling means in a number of different ways in a series of different configurations in order to produce different resultant forces by the exertion of pressure loadings and traction loadings in the individual pulling means. It is also possible to regulate the pressure in the pulling means to various levels of pressure according to need, so that different traction effects are achieved in the individual pulling means. For example, one can utilise the possibility of axial movement of the pulling means in a favourable manner in combination with its traction properties. In this connection, the pulling means can be used to a large extent as a resilient pulling means, where the characteristic of a spring can be regulated by regulating the pressure.

In engaging a pressure-regulatable pulling means according to the invention between for example two wire parts or two chain parts or two other elongate elements, one has the possibility to increase and reduce the tension in the associated wire or chain or other element more or less independently of the position of the wire or the chain or other element. This arrangement can be employed under different conditions of use instead of a hoisting winch or hauling winch.

Figure 15:
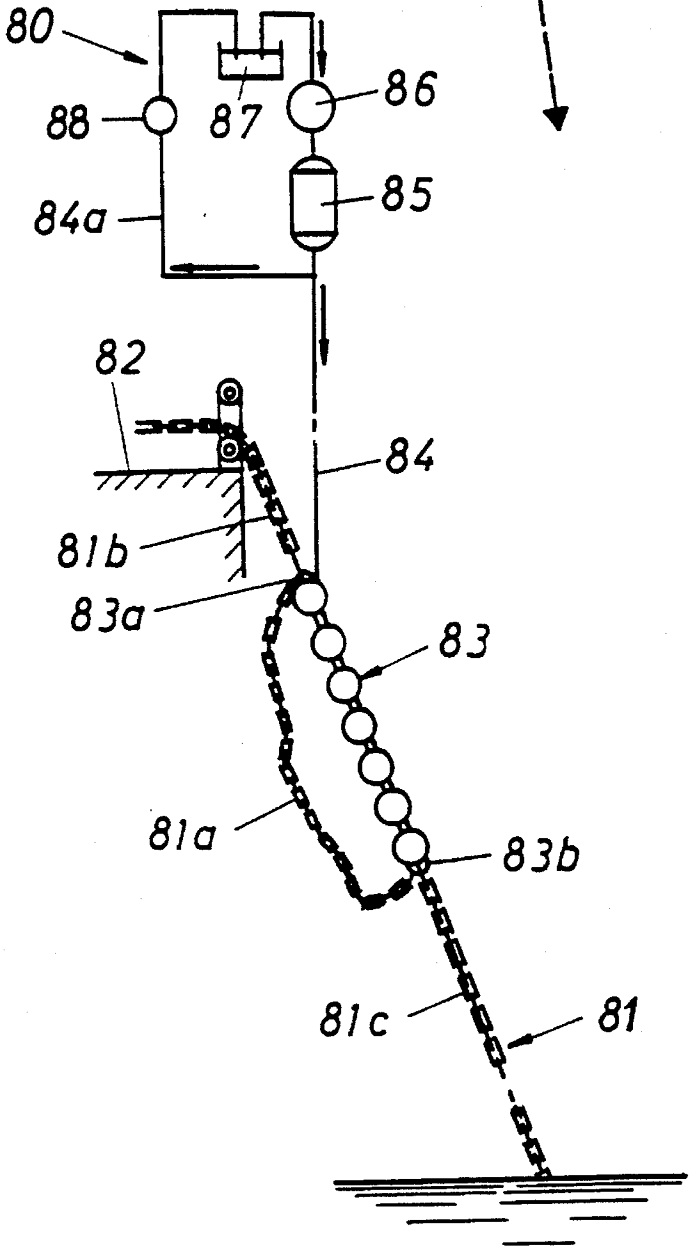
FIG. 15 shows in side view another particular application of a pulling means according to the invention, illustrated in connection with a "mooring" operation on board a vessel.

In FIG. 15 there is shown an arrangement 80 which can be employed in combination with a chain 81 for anchoring for example a bore platform 82 to the sea bottom (not shown further) with a constant tension (so-called "mooring" operation). There is shown a pulling means 83 according to the invention, which is inserted in the chain in a "short circuiting" manner, a region 81*a* of the chain 81 extending slack between ends 83*a*, 83*b* of the pulling means, which are directly fastened in between their respective chain part 81*b*, 81*c*. If the pulling means should fail (for example be broken in pieces) the chain part in the region 81*a* can assume the tension loading in the chain 81 round the pulling means.

There is illustrated a single pressure medium conduit, in the form of a hydraulic pressure hose 84, from a pressure tank 85 to the shown upper end of the pulling means 83. The pressure tank is supplied pressure oil from a pump 86 with associated oil reservoir 87 and feeds pressure oil at a regulatable, but permanently adjusted pressure to the pulling means 83 for exerting a set tension in the pulling means. Excess pressure oil is delivered from the pressure hose 84 in a short circuit path 84*a* back to the oil reservoir 87 via a back pressure valve 88, which establishes the oil pressure in the pressure hose 84. By increasing tension in the chain 81 the back pressure valve 88 will release excess pressure oil back to the oil reservoir in order to maintain the set pressure in the chain and by reducing tension in the chain 81 the pressure tank 85 and associated pump 86 will stabilize the pressure in the pulling means at the set pressure.

In connection with occurring tension variations in the chain the pulling means will also allow a considerable elastic effect in the pulling means itself in order thereby to be able to take up corresponding movements in the chain during occurring increasing or decreasing tensions in the chain. This involves that movements in the chain within the vessel can be avoided, by arranging the pulling means in the chain outside the vessel.

On positioning of bore platforms and the like, one usually employs a so-called "constant tension" winch, where the winch is adjusted with a constant tension force and hauls in chain where the tension in the chain falls and releases chain when the tension in the chain rises above the established chain tension and this is effected at the same time as the chain is subjected to axial movement inwardly on or outwardly from the drum of the winch.

By the use of the pulling means 83 according to the invention inserted in the chain itself, as is shown in FIG. 15, one can make oneself independent of the winch by normal positioning, and only use the latter in connection with releasing and hauling in of chain or carrying out the "mooring" operation in a situation where the pulling means it put out of operation. Furthermore by being engaged as shown in the chain one can avoid the otherwise normal, wear-producing movement of the chain inwardly into and outwardly from the winch and the vessel besides.

In different hoisting and hauling operations one can generally, according to the invention, make oneself wholly independent of conventional winches and let the pulling means serve as a "winch" in intermittent hauling in or release operations. In such applications special chain gripping means (not shown further) can be employed in addition, which cooperate with the pulling means in connection with each hauling in or releasing operation.

In FIG. 16 it is in cross-section shown a section of a pulling means 90 which is provided with an extra air valve 91 which is to contribute to improving the use qualities of the pulling means 90.

The air valve 91 comprises a spherical valve body or float 92, which normally forms support against a lower abutment 93, but which at float effect forms abutment against an upper valve seat 94. It is shown an outer, upper filling and discharging opening 91*a* just above the valve seat 94 and a lower air opening 91*b* centrally in the abutment 93 and rows of inner filling and discharging openings 91*c* and 91*d* arranged over each other.

The air valve 91 finds special use by a pulling means where the pressure medium is fluid (water). The air valve 91 is located at the uppermost end of the pulling means 90 in order to form float valve. During filling of fluid (water) into the pulling means 90 the air valve 91 takes care that air which is received in the pulling means is discharged consecutively, until the fluid lifts the valve body or the float 92 away from its abutment 93 and towards its valve seat 94 and thereby closes the valve.

One can by this ensure that air collections in the pulling means can be discharged so to say completely and that the pulling means correspondingly can be filled so to say exclusively with fluid. One can take care that the fluid is filled under a certain, relatively moderate overpressure, so that one ensures an intended maximal dilation of the pulling means by means of a moderate fluid pressure. Increased interior pressure in the pulling means will give correspondingly increased closing pressure on the valve body. As required, it can be used extra fluid pressure in order to increase the overpressure in the pulling means.

As soon as the fluid pressure decreases in the pulling means or as soon as one starts the discharging of fluid from the pulling means one can ensure that the valve body or the float 92 is drawn away from the valve seat and downwards towards its lower abutment 93. Thereby the valve opens and one can thereby allow a quicker and simultaneously more complete discharging of fluid from the pulling means.

In FIG. 17 and 18 it is shown an alternative solution for improving the use qualities of the pulling means. It is shown a pulling means 95 which in the shown embodiment example is loaded with gaseous pressure medium. The pulling means comprises a row of outer covers 96, which are constructed correspondingly as shown in one or more of the preceding embodiment examples, and a separate inner cover 97, which can be constructed correspondingly as a cylindrical body of softly flexible, non-elastic material, that is to say of same material as the outer covers 96. The row of outer covers 96 is shown with a first filling opening 96*a* with an associated filling and discharging valve 96*b*, and the inner cover 97, which is fastened at mutually opposite ends by fastening portions 98 and 99 in the row of outer covers 96, is in the one fastening portion 98 itself provided with a second filling opening 97*a* which runs through the fastening portion 98 and which is provided with an associated filling and discharging valve 97*b*. One can by this obtain a double acting pulling means by alternately filling the row of covers 96 while the cover 97 is discharged, and filling the cover 97 while the row of covers 96 is discharged, respectively. By filling the row of covers 96, the pulling means assumes a state as suggested in FIG. 17, while the cover 97 (which then has open discharging valve 97*b*) correspondingly is discharged of pressure medium. By thereafter filling the cover 97, while the discharging valve 96*b* of the row of covers 96 is open, one can extend the pulling means 95 in axial direction and simultaneously contribute to quick and effective discharging of the row of covers 96.

Instead of the arrangement shown, with the double acting pulling means with an outer and an inner cover, one can use one single cover, which is provided with, for example, longitudinal leaf springs (laths or other means not further shown) which normally hold the cover extended lengthwise (correspondingly as shown in FIG. 18), but which allow that the cover assumes contracted, pressure-loaded state (correspondingly as shown in FIG. 17) by pressure medium loading of the cover.

I claim:

1. A pulling arrangement comprising a series of longitudinally collapsible covers, said covers being longitudinally extendable into an extended position to define a row of successive hollow spaces;

a pair of fastening means, each fastening means being secured at a respective longitudinal end of said series of covers;

means for delivering inflating medium into said hollow spaces of said covers in said extended position thereof to radially expand each said space while longitudinally contracting each said space to effect a constriction of said covers from said extended position; and a plurality of radially constricted transition portions, each transition portion being disposed coaxially between and in communication with an adjacent pair of covers to convey an inflating medium therebetween.

2. A pulling arrangement as set forth in claim 1 wherein said series of covers is formed of a series of stacked annular discs, each said disc being secured at an outer peripheral edge to an adjacent disc and being secured at an inner periphery to another adjacent disc.

3. A pulling arrangement as set forth in claim 2 wherein each disc is made of soft non-elastic stretch-firm material.

4. A pulling arrangement as set forth in claim 2 wherein said discs are collapsible into a folded together position wherein said discs are disposed in a flattened configuration.

5. A pulling arrangement as set forth in claim 1 wherein each cover is of cylindrical shape in a radially expanded state.

6. A pulling arrangement as set forth in claim 1 wherein each cover is of spherical shape in a radially expanded state.

7. A pulling arrangement as set forth in claim 1 which further comprises an arcuate abutment having at least some of said covers slidably mounted thereon to impart an arcuate shape to said series of covers in an inflated position thereof.

8. A pulling arrangement as set forth in claim 1 which further comprises a second cover concentrically within said series of covers, and a second means for delivering an inflating medium into said second cover during discharge of medium from said series of covers to radially expand said second cover into a cylindrical shape and to effect extension of said series of covers into said extended position thereof.

9. A lifting apparatus comprising a plurality of annular discs of non-elastic flexible material disposed in stacked relation to move between a collapsed position and an extended position defining an elongated hollow space, each said disc being secured at an inner periphery to one adjacent disc and being secured at an outer periphery to another adjacent disc;

a pair of circular discs, each said circular disc being disposed at a respective end of said stacked annular discs and having an outer periphery secured to an adjacent annular disc thereat;

a pair of fastening loops, each loop being secured to a respective circular disc; and a nipple mounted on one of said circular discs for delivering a pressure medium into said elongated hollow space with said annular discs in said extended position to radially expand said hollow space while longitudinally contracting said hollow space to effect movement of said fastening loops toward each other.

10. A lifting apparatus as set forth in claim 9 wherein said circular discs are made of canvas.

11. A lifting apparatus as set forth in claim 9 which further comprises means for delivering compressed air through said nipple into said hollow space.

12. In combination means defining an upper stationary fastening joint;

means defining a lower movable fastening point;

a lifting apparatus suspended from said stationary fastening point, said lifting apparatus including a plurality of annular discs, each disc being secured at an inner periphery to one adjacent disc and being secured at an outer periphery to another adjacent disc to define an elongated hollow space in an extended position of said lifting apparatus; and means for delivery an inflating medium into said hollow space to radially expand said space while longitudinally contracting said space to effect lifting of said means defining said movable fastening point.

13. The combination as set forth in claim 12 wherein said means defining said stationary point is one part of a chain and said means defining said movable point is a second part of a chain.

14. The combination as set forth in claim 13 which further comprises a bore platform having said chain secured thereto for anchoring said platform to a sea bottom, and wherein said chain extends in a slack condition between said points with said lifting apparatus in an inflated condition.

* * * * *